(12) United States Patent
Martín Hernández (10) Patent No.: US 7,273,989 B2
(45) Date of Patent: Sep. 25, 2007

(54) ACTUATOR SAFETY ATTACHMENT DEVICE

(75) Inventor: Agustín Mariano Martín Hernández, Madrid (ES)

(73) Assignee: Airbus Espana, S.L., Getafe, Madrid (ES)

( * ) Notice: Subject to any disclaimer, the term of this patent is extended or adjusted under 35 U.S.C. 154(b) by 100 days.

(21) Appl. No.: 11/172,302

(22) Filed: Jun. 30, 2005

(65) Prior Publication Data

US 2006/0207357 A1 Sep. 21, 2006

(30) Foreign Application Priority Data

Dec. 31, 2004 (ES) ................................. 200403172

(51) Int. Cl.
*H01H 3/02* (2006.01)
*H01H 3/14* (2006.01)
*H01H 35/00* (2006.01)

(52) U.S. Cl. ..................... 200/52 R; 200/331; 200/337
(58) Field of Classification Search .............. 200/52 R, 200/337, 331
See application file for complete search history.

(56) References Cited

U.S. PATENT DOCUMENTS

| 2,855,478 | A | * | 10/1958 | Schneider et al. | ......... 200/52 R |
| 3,711,664 | A | * | 1/1973 | Benoit et al. | ............... 200/5 R |
| 3,735,066 | A | * | 5/1973 | Greenwald et al. | ....... 200/52 R |
| 6,706,984 | B1 | * | 3/2004 | Turner | ........................ 200/331 |

* cited by examiner

*Primary Examiner*—Elvin Enad
*Assistant Examiner*—Lheiren Mae A. Anglo
(74) *Attorney, Agent, or Firm*—Klauber & Jackson L.L.C.

(57) ABSTRACT

Safety attachment device for an actuator (1) attached at its ends respectively to a first and a second part (2, 3) which are connected to one another also by means of a reaction bar (4) which is located on the top of the actuator (1), said device comprises an upper part (5, 5a, 5b) immobilized on the reaction bar (4) and side arms (6, 7) which clasp the sides (1c, 1d) of the actuator (1), both having windows (8, 9) through which respective pins (10, 11) joined to these sides (1c, 1d) pass, the pin (10, 11) thus being situated without making contact with the edges of the window when the actuator is attached to the parts (2, 3), and each window (8, 9) being of a horizontal extension such that its side edges do not touch the pin (10, 11) which passes through said window (8, 9) when the actuator (1) is disconnected from any of the parts (2, 3).

21 Claims, 5 Drawing Sheets

ACTUATOR SAFETY ATTACHMENT DEVICE

RELATED APPLICATIONS

The present application claims priority from Spanish Patent Application Serial No. P200403172 and filed on Dec. 31, 2004. Applicant claims priority under 35 U.S.C. §119 as to said Spanish application, and the entire disclosure of that application is incorporated herein by reference.

TECHNICAL FIELD OF THE INVENTION

The present invention pertains to the field of the actuators which actuate moving elements, particularly to the area of the safety devices intended for preventing such actuators from falling fully or in part in the case that any of the anchorings are accidentally disconnected, and particularly to those devices where the full or partial falling thereof may have a negative impact on the safety of the element on which the installation is made. The device of the present invention is applicable to those installations in which the body of the actuator is fixed to a structural element by means of a connection which allows a relative movement between both of them.

Thus, the present invention may be applicable in:
- the aerospace industry, in relation to those actuators used to tilt moving elements with regard to fixed elements, such as the actuators for aircraft elevators, flaps, etc.
- the shipbuilding industry, especially in submarine building where space is also limited, with considerations similar to the aeronautical industry;
- hydraulic systems with sluices moved by means of actuators, in applications of major responsibility (dams, thermal/nuclear power plants, etc.), where the actuator might cause blockages which might lead to overpressures in the system;
- robotics, both in industrial production plants and in stand-alone systems (surveillance/exploration robots, etc.).
- cranes and hoisting systems having an impact on human safety (operators and/or persons not involved in the operation of the machine).

STATE OF THE ART PRIOR TO THE INVENTION

In a typical installation, the actuator is usually connected to a fixed structural element at one end, which may be referred to as a "fixed end", and to an element which is intended to be moved at the opposite end which may be referred to as the "moving end". Both ends are usually equipped with ball and socket joints and, when necessary, with anti-rotation devices preventing the equipment from overturning.

When the end purpose of the installation is to cause a translating movement, guides are necessary for assuring the proper movement of the part to be shifted in position, whilst when the end purpose of the installation is to cause a rotating movement, an auxiliary structure which provides a spin axis for the moving part is necessary. In these cases, a reaction bar is usually located by the actuator, connecting the fixed structural element and the moving element by grasping the moving element by the axis, providing an additional pivoting point and the loads of the actuator reacting directly, thus making it possible to lighten the additional supporting structure.

In the installations of this type, it may be necessary, for safety-related reasons, to provide means which limit the movements of the actuator body in the event that any of the aforementioned connections are lost, thus preventing the impact thereof and the resulting damage to other adjacent elements or a possible blocking of the moving part.

The disconnection of the actuator attachments may occur, although they are usually protected by redundant means, by human error (improper installation of the connecting elements) or by breakage of any of the elements involved. When the disconnection occurs in the fixed part, the actuator body will move by revolving around the tie-down point of the moving end. A dragging movement of the actuator body may also be caused in the event that the moving element to which the actuator is attached continues moving, be it a translating or a revolving movement. On the other hand, if the disconnection occurs in the moving part, the actuator body will move by rotating round the tie-down point of the fixed end. In this case, the aforementioned dragging movement will not occur. The presence of dragging movement may be especially critical, as the electrical, hydraulic or pneumatic connections which feed the actuator may not be prepared to withstand this movement.

In aircraft elevators, both the axis of the actuator as well as the axes of the attachments thereof are in nearly horizontal position, and the ends used have ball and socket joints mounted which allow for a spherical movement in accordance with that which has previously been discussed hereinabove, and have anti-rotation devices which prevent the actuator from revolving on its axis. In the hydraulic installation necessary for producing the rotating movement of aircraft elevators, such an installation usually comprises two actuators for each elevator, constituting a redundant system which, in the event of the fault of one actuator, provides a back-up actuator making it possible to govern the moving part, in other words, the elevator. This is important in case of a fault such as that described hereinabove occurs, as the disconnection of the actuator will cause a dragging movement on the elevator continuing to move.

The protection against the disconnection of the attachment of an actuator is a safety requirement nowadays. For solving the problems inherent to the disconnection of an actuator from one or both of its attachments, state-of-the-art devices have been developed.

Thus, there is a known device which comprises a fitting, fixed to the reaction bar, which enfolds the actuator at the top part thereof. The actuator has two pins in its sides, from which it will be suspended in the event of losing the connection on the moving part. Two angle irons secured to the ends of the main fitting of the attachment device, which can be dismantled for maintenance purposes, provide both windows large enough to house the corresponding side pin of the actuator during its normal operation. In the event of the disconnection of the actuator, the actuator will move freely, although gravity will make it fall until the pins make contact with the bottom edge of the corresponding window, thus limiting its movement. This system does not provide protection in the case of disconnection at the fixed end, thus being limited in application, given that, in fact, it does not provide protection in all of the foreseen cases. It may likewise entail maintenance problems during the process of installing/uninstalling the actuator, being necessary to dismantle the angle irons anchored to the top part in order to be able to free the actuator.

Also known is a safety attachment device for actuators in the event of disconnection of structural attachment at either of its two ends with adjacent auxiliary structure, which comprises some supports integrated into the adjacent structure, which, depending upon the design thereof, may directly support the actuator body or some pins in the sides of the actuator, similar to those of the immediately preceding solution hereinabove. The need for such additional elements complicates the structure of that device and may also entail access-related problems for maintenance or for ventilation of the actuator in the event that it was necessary, on enclosing the environment of the actuator to a great extent, preventing proper air circulation.

Likewise known is another safety attachment device for actuators with its horizontal longitudinal axis, vertical attachments axes and reaction bar on one side of the actuator, which comprises some anchorings located at the top of the actuator, and a specific auxiliary structure, separate from the supports of the moving part, from which the actuator can hang in the event of disconnection by means of some straps connected to the aforementioned anchorings. This device, installed on a vertical instead of a horizontal stabilizer, changes the relative direction in which the force of gravity acts, requires additional structural elements, which require quite a large amount of space and, additionally, on being located on the horizontal plane, hinders access to the top part thereof in maintenance procedures.

It was therefore desirable to develop a safety attachment device which, by overcoming the drawbacks of the state-of-the-art devices, effectively fulfilled the safety requirements by providing protection against the disconnection of both ends of the actuator, had a minimum impact on weight and without needing any additional support structure, and which in turn made it possible to easily perform the actuator maintenance procedures, especially those related to the installation/uninstallation of the system.

DESCRIPTION OF THE INVENTION

The present invention is for the purpose of overcoming the drawbacks of the state of the art stated hereinabove by means of a safety attachment device for an actuator attached by its first end part to a first attachment point on a first part, and by its second end part to a second attachment point to a second part, such that the actuation of the actuator causes a relative shift in position between said first and said second part, said parts being connected to one another additionally by means of at least one reaction bar articulated by its respective ends to said parts, the actuator being situated on a first plane which extends between said connection points, and the reaction bar being situated on a second plane which extends between said ends of the reaction bar above said first plane, the device comprising
  a top part immobilized on the reaction bar,
  a first side arm and a second side arm which extends downward from said top part and clasp at least part of the sides of the actuator,
  a window in each of said side arms, through which a first safety pin connected to a first side of the actuator and a second safety pin connected to a second side of the actuator opposite said first side passes, each pin having a free end which emerges through the respective window;
in said device
  each of the windows is of dimensions larger than the cross-section of the safety pin passing through it, such that the safety pin remains ready without touching the edges of said window when the actuator is connected to said parts even in the movements of actuating the actuator, and a horizontal extension such that their side edges do not come into contact with said pin when a disconnection of the actuator of at least on of said parts occurs.

By means of this device, and particularly due to the dimensioning of the window, the movements of the actuator which are caused in the case of accidental disconnection of one or both of its connection points can be controlled.

Thus, in the event of disconnection of the actuator from the connection point on the part corresponding to a moving structure in which the actuator body would be subject to incur in rotating, circular or spherical movements depending upon the degrees of freedom allowed by the ball and socket joint installed on the fixed end, around the connection point on the part corresponding to a fixed structure, gravity will make the actuator body fall until the pins come into contact with the bottom edge of the window, such that the rotational movements are limited.

On the other hand, in the event of a disconnection from the connection point on the part corresponding to the fixed structure, in which the actuator would be subject to incur in movements similar to those of the immediately preceding case hereinabove, but rotating around the connection point on the part corresponding to the moving structure, it also being possible for a movement dragging the actuator body to occur, in the event that the moving element to which the actuator is attached continues moving, be it translational or rotational, all of these movements are controlled. Thus, in this case, gravity will make the actuator body fall until the pins come into contact with the bottom edge of the window, thus limiting its turning movements, such that the actuator will be able to make the dragging movements in a controlled manner, being of suitable length to both sides of the pin to allow all of the possible cases of drag without there is any contact between the pin and the side edges of the window, thus preventing from loads being caused in the lengthwise direction of the actuator for which the device, for reasons of weight lightening, is not necessarily prepared.

The actuator to which the present invention is applied may be an actuator including a casing from which the end parts emerge. This type of actuators with casings is conventional per se and may be, for example, a hydraulic actuator which is used for governing the elevators of an aircraft. In this case, the sides of the actuator are side walls of the housing from which the safety pins jut out, such that the side arms surround at least part of said side walls.

The pins may be overhangs interlocked with said side parts of the actuator, eventually with their free ends ending in widenings which emerge through the corresponding window, or bolts with one end fitted with a thread and a head and a smooth cylindrical part, installed at the sides of the actuator such that the threading of the bolt is screwed into the sides, the smooth cylindrical part of the bolt emerges from the sides and through the window, while the head of the bolt emerges through the window. The aforementioned widenings or, wherever applicable, the heads of the bolts are for the purpose of assuring that when the actuator is disconnected from one or from both of the connection points, and therefore the safety pins are then resting on the bottom edge of the windows provided in the side arms, the lateral movements cannot cause the pin to lose contact with the side arms. This is important above all in the cases in which the actuator body is asymmetrical, in which case the pins in each one of the sides are of different lengths. Thus, if a lateral movement were to occur under these conditions toward the side of the long ping, the short pin might lose contact with the support, the actuator body falling sideways and the entire system losing effectiveness. To solve this problem, the aforementioned widenings or the bolt head are provided, which serve as a stop with the side arms of the attachment device on the outside thereof, such that the lateral movements of the actuator are limited.

The top part of the device of the present invention is preferably formed by a main fitting and a secondary fitting which are interconnectable, for example, in a manner conventional per se by means of bolting, such that they form a clamp holding the reaction bar in place.

To facilitate the maintenance tasks, in the case of installing/uninstalling the actuators, the windows may be provided with an open section at the bottom which constitutes an opening in the in/out moving path of the pins. For this purpose, at least one of the side arms comprises of converging sections between the respective free ends from which this open section which connects with the window and which is of a larger size than the cross-section of the corresponding pin is defined. To close the open section, the device comprises a closing element and blocking means for keeping the closing element in closed position. The open section is preferably located in an area corresponding to an upright projection of said pin. The closing element may be a hinged part which provided continuity for the bottom edge of the window and which comprises a strip articulated by a first end part on an articulation point on one of the converging sections and joined by the blocking means by the opposite end part on the other of the converging sections. The presence of a hinged element which does not separate from the structure minimizes the risk of loss of elements during the procedure, likewise facilitating the subsequent positioning of the part, given that it will be guided into its position by means of the hinge, reducing the requirements of accessing the area for performing the maintenance.

Alternatively, the blocking element may also be a section, preferably with an inverted-"U" cross-section and with a length longer than the extension of said open section, and which can be slide over said converging sections between a closing position in which it closes the open section and an opening position in which it does not cover at least part of said open section, and, in the closing position, said section is connected to at least one of the converging sections of the bottom edge of the window.

In one particular embodiment of the invention, on each arm the window is bounded on the sides between a first lateral section and a second lateral section of the side arm, connected to one another by means of a closing element which sets the bounds of the bottom edge of the window. This closing element, which may be, for example, a bar or a section, is articulated by its first end to an articulation point on the second lateral section, and connected by its second end to the first lateral section by way of blocking means. Thus, when the closing element opens, an open section is defined between the aforementioned lateral sections, the horizontal extension of which corresponds to the extension of the bottom edge of the window.

Additionally, in order to be able to perform tasks which do not require uninstalling the actuator, the side arms can be removed by loosening some bolts accessible from the bottom part of the fitting.

Based on the preceding description hereinabove, it follows that the general structure of the device of the present invention and the particular embodiments thereof overcome the drawbacks inherent to the conventional safety attachment devices.

BRIEF DESCRIPTION OF THE DRAWINGS

A brief description is provided in following of some practical embodiments of the elements based on some figures in which.

In these figures, references are used identifying the following elements:
1 actuator
1a first end part of the actuator
1b second end part of the actuator
1c first side part of the actuator
1d second side part of the actuator
2 first part
2a first connection point of the actuator
3 second part
3a second connection point of the actuator
4 reaction bar
4a,4b ends of the reaction bar
5 top part of the device
5a main fitting
5b secondary fitting
6 first side arm
6a, 6b converging sections
6c open section
6d first lateral section of the first side arm
6e second lateral section of the first side arm
7 second side arm
7d first lateral section of the second side arm
7e second lateral section of the second side arm
8 window in the first side arm
9 window in the second side arm
10 first pin
10a free end of the first pin
11 second pin
11a free end of the second pin
12 widening of the free end of the first pin
13 widening of the free end of the second pin
14, 14' closing element
15 blocking means
16 articulation point of the closing element

EMBODIMENTS OF THE INVENTION

According to the embodiment shown in FIGS. 1 to 4, the safety attachment device is applied to an actuator 1 attached by its first end part 1a to a first connection point 2a on a first part 2 which is fixed, corresponding to the fixed structure of the aft horizontal stabilizer of an aircraft, and by its second end part 1*b* to a second connection point 3*a* on a second part 3 which is moving which forms part of the moving structure of an aircraft elevator. Thus, the actuation of the actuator 1 causes a relative shift in rotation between the first and said second parts 2, 3. The parts 2, 3 are connected to one another by means of a reaction bar 4 articulated by its respective ends 4*a*, 4*b* to these parts 2, 3. The actuator 1 is situated on a first plane which extends between said connection points 2*a*, 3*a*, whilst the reaction bar 4 is situated on a second plane which extends between the ends 4*a*, 4*b* of the reaction bar 4 above said first plane.

The safety attachment device for the actuator 1 comprises a top part 5 immobilized on the reaction bar 4. This top part is comprises an upper main fitting 5*a* and a secondary fitting 5*b* below which clamp the reaction bar 4. From the main fitting 5*a*, extending downward, is a first side arm 6 and a second side arm 7, enfolding one part of the side walls 1*c*, 1*d* of the actuator 1. At their bottom part, the arms 6, 7 each comprise a window 8, 9, respectively passed through by a first safety pin 10 connected at a first lateral part 1*c* of the actuator 1, and by a second safety pin 11 connected to a second lateral part 1*d* of the actuator 1. The free ends 10*a*, 11*a* of the pins 10, 11 are ended in widenings 12, 13 and emerge through the respective window 8,9. The safety pins 10, 11 are overhangs interlocked to the lateral walls 1*c*, 1*d* of the actuator 1. Laterally, the windows 8,9 are bounded between lateral sections 6*d*, 6*e*, and lateral sections 7*d*, 7*e* of the respective side arms 6, 7.

Each window 8, 9 is larger in size than the cross-section of the safety pin 10, 11 passing through it, such that the safety pin 10, 11 remains ready without coming into contact with the edges of the corresponding window, when the actuator is connected to said parts 2, 3 and a horizontal extension such that its side edges do not come in contact with said pin 10, 11 when a disconnection of the actuator 1 from at least one of said parts 2, 3 takes place. The extension of the window must be large enough so that in the normal actuating movements of the actuator 1, the safety pins 10, 11 do not come into contact with any of the edges of the windows 8, 9.

According to the embodiment shown in FIGS. 1 to 6, the window 8 at the bottom of the arm 6, is bounded by each of the converging sections 6*a*, 6*b*, the free ends of which define, between them, an open section 6*c* connected to window 8. The open section 6*c* is larger than the cross-section of the pin 10.

Figure 1:
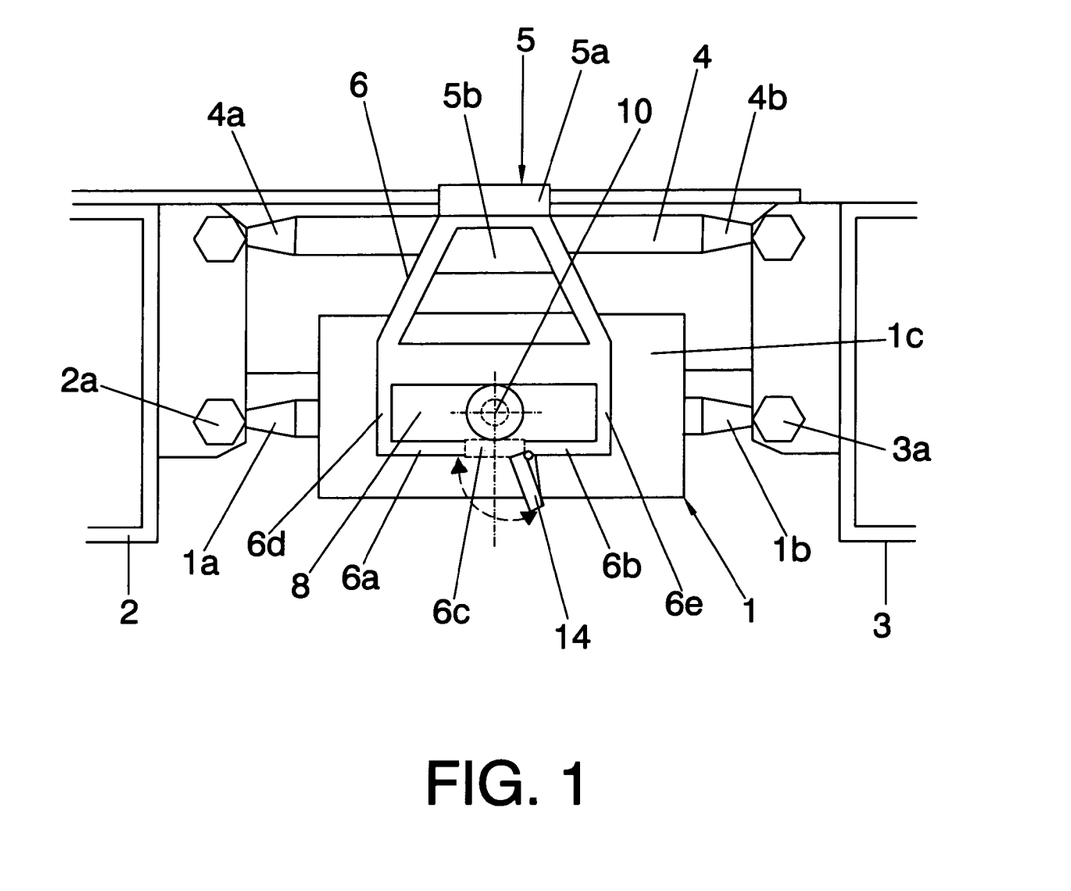
FIG. 1 is a schematic elevational side view showing the arrangement of a first embodiment of the device of the present invention.
Figure 2:
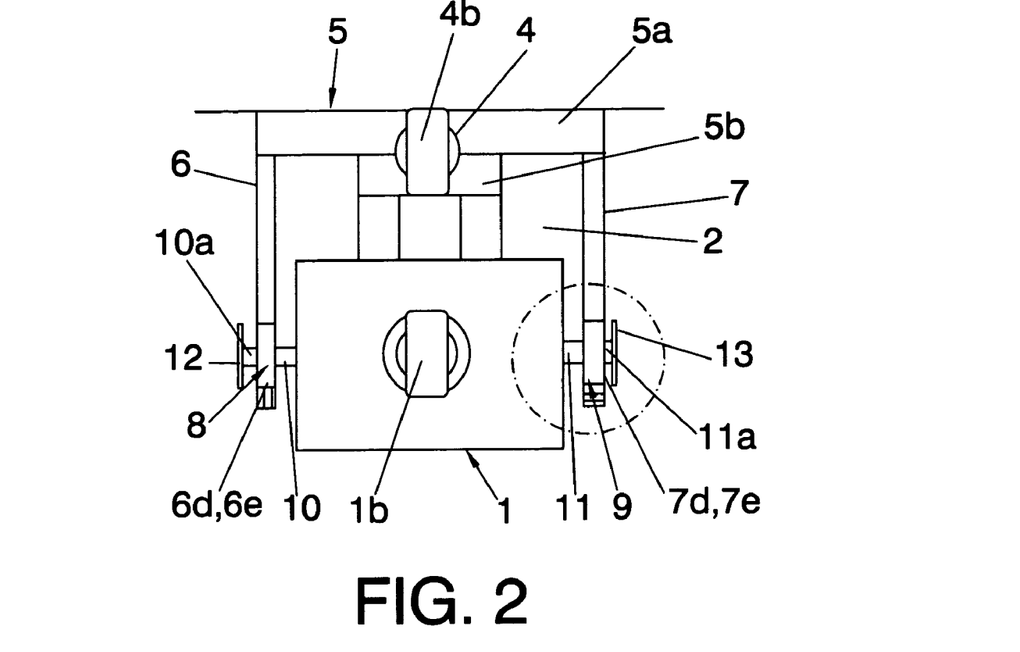
FIG. 2 is a schematic front view of the device shown in FIG. 1.
Figure 3:
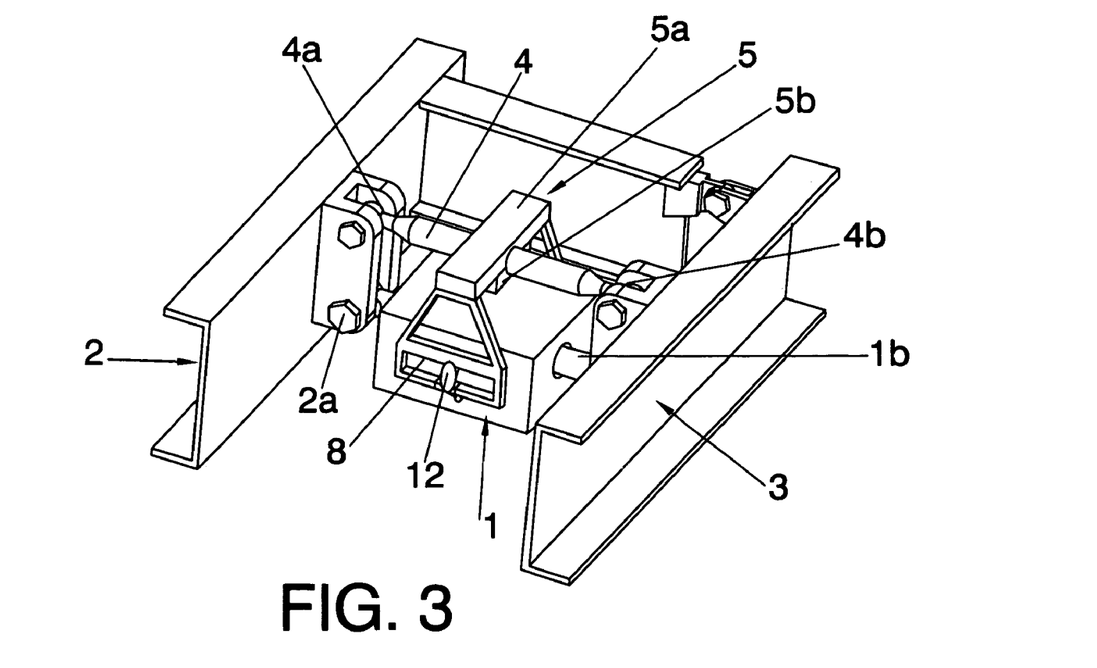
FIG. 3 is a schematic perspective view of the device shown in FIGS. 1 and 2.
Figure 4:
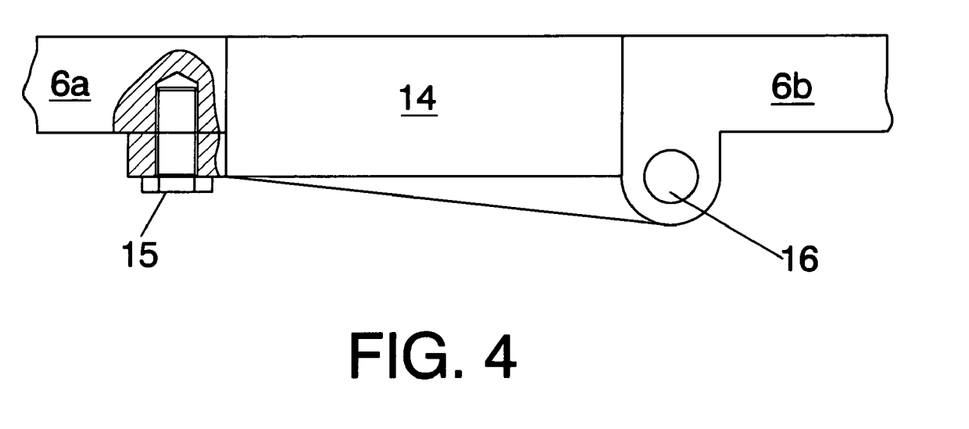
FIG. 4 is a schematic side view of a first constructive alternative of the closing element applicable to the device of the present invention.

According to the constructive alternative shown in FIG. 4, the open section can be closed by means of a closing element in the form of a strip 14 articulated by the first end part thereof on an articulation axis 16 on the converging section 6*b*. The articulation axis 16 is located on a bottom overhang on the free end of the converging section 6*b*. At its other end part, the strip 14 is connected to another converging section 6*a* by blocking means comprising a bolt/washer/nut assembly 15.

The open section 6*c* is located in an area corresponding to an upright projection of said pin 10 and allows, when the strip 14 is in the open position, the safety pins to pass through in the case that it is necessary to remove the actuator 1.

Figure 5:
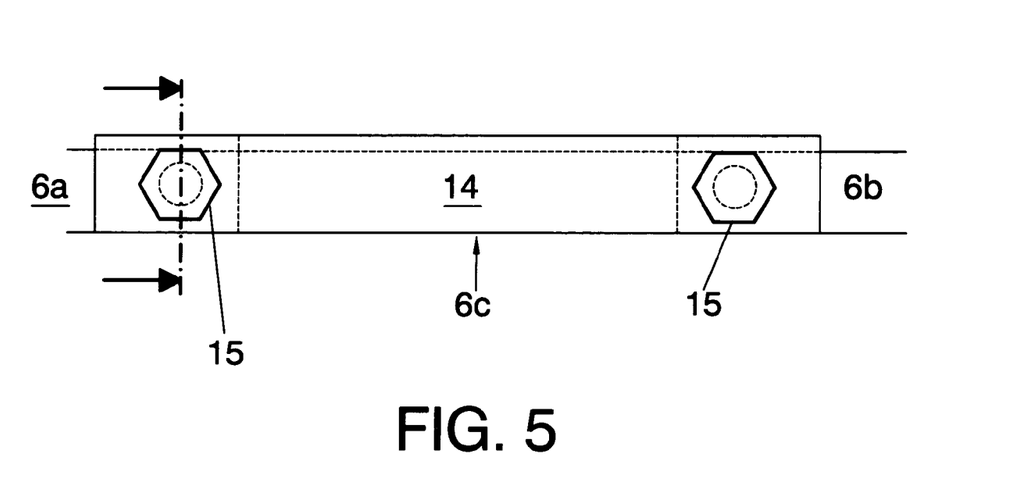
FIG. 5 is a schematic side view of a second constructive alternative of the closing element applicable to the device of the present invention.
Figure 6:
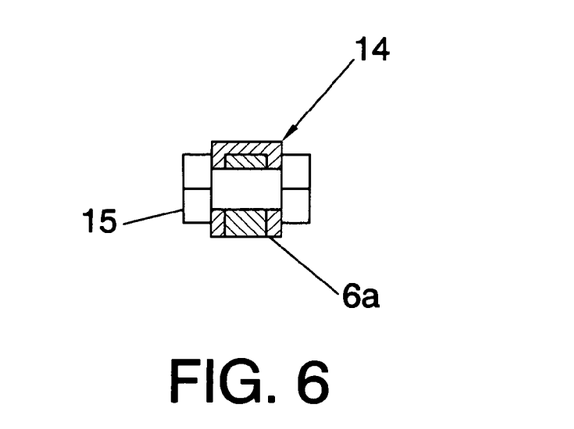
FIG. 6 is a schematic cross-sectional view of the closing element shown in FIG. 5 according to the cross-line appearing in FIG. 5.

FIGS. 5 and 6 illustrate a constructive alternative of the closing element, comprising a section 14 in the shape of an inverted "U" longer in length than the extension of the open section 6*c*. The section 14 can slide over the converging sections 6*a*, 6*b* between the closed position shown in FIGS. 6 and 7 in which it closes the open section 6*c*, and an open position in which it does not cover at least part of said open section 6*c* not shown in the figures. In the closing position, the section 14 is connected by its end parts respectively a one of the converging sections 6*a*, 6*b* of the bottom edge of the window 8.

The window 9 can obviously be outfitted with an open section, of closing elements and blocking elements equivalent to those of the window 8 previously described hereinabove.

Figure 7:
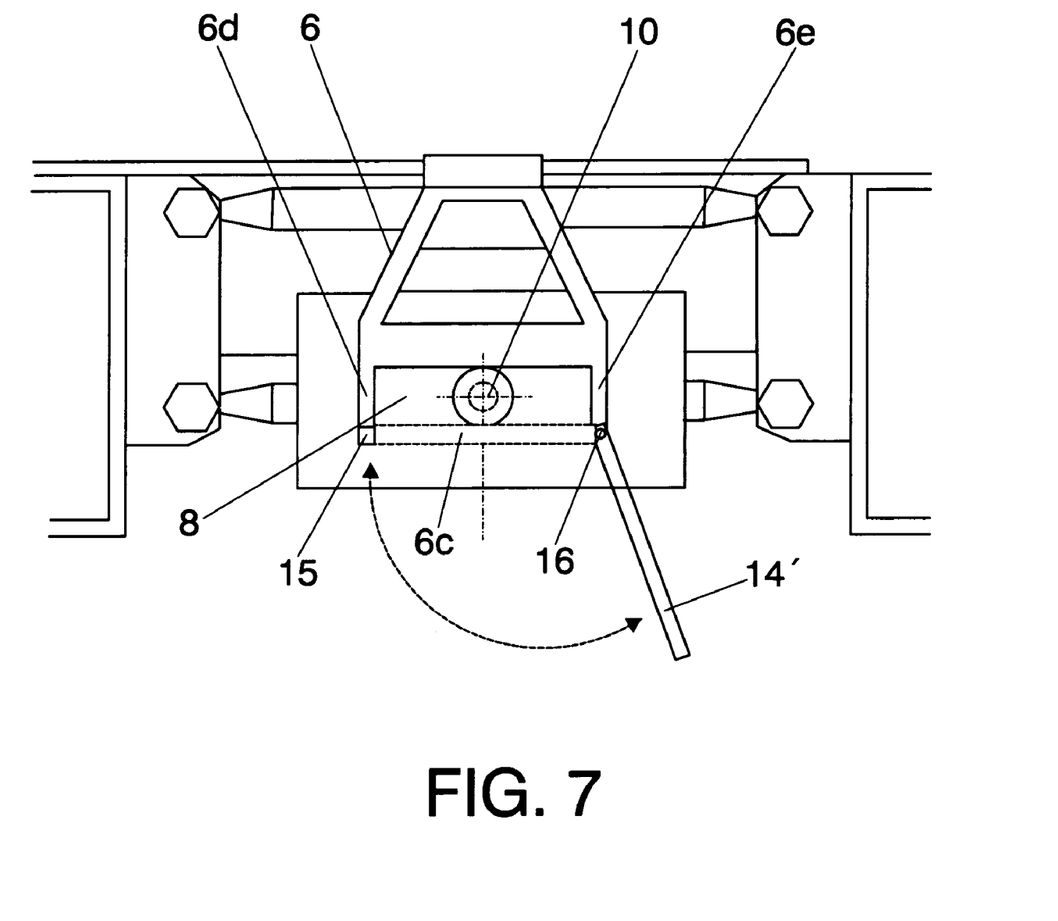
FIG. 7 is a schematic elevational side view showing the arrangement of a second embodiment of the device of the present invention.

In a second embodiment of the safety attachment device of the present invention, shown with regard to the side arm 6 in FIG. 7, the side arms 6, 7 have open lower edges defined between each of the lateral sections 6*d*, 6*e*, 7*d*, 7*e* of the side arms 6, 7 such that the open section 6*c*, 6*d* corresponds to the bottom extension of the respective window 8,9. In this embodiment, the bottom edge of the window and the open section 6*c* are of the same horizontal extension.

This open section 6*c* closes by means of a closing element 14' consisting of an articulated section or bar by its first end part on an articulation axis 16 to the bottom end of the corresponding lateral section. By its other end part, the closing element 14' is connected to the end of the other lateral section by means of some conventional blocking means 15 analogous to those previously described hereinabove with regard to FIG. 4.

The invention claimed is:

1. Safety attachment device for an actuator connected by a first end part to a first connection point on a first piece and by a second end part to a second connection point on a second part, such that the actuation of the actuator causes a relative shift in position between said first and second part, said parts being connected to one another additionally by means of at least a reaction bar articulated by its respective ends to said parts,
   the actuator having sides and being situated on a first plane which extends between said connection points, and the reaction bar being situated on a second plane which extends between said ends of the reaction bar above said first plane; the safety attachment device comprising:
   a top part immobilized on the reaction bar;
   a first side arm and a second side arm which extend downward from said top part and enfold at least part of the sides of the actuator,
   both of said side arms are respectively crossed through by a first safety pin connected to a first side part of the actuator, and by a second safety pin connected to a second side part of the actuator opposite said first side part, each pin having a free end which emerges through a respective window; wherein
   each window is larger in size than the cross-section of the safety pin passing through it, such that the safety pin remains ready without coming into contact with edges of said window when the actuator is connected to said parts, said window having dimensions being large enough to prevent, when the safety pins are moved by way of operating movements of the actuator, said pins from coming into contact with edges of the windows, and
   each window is of a horizontal extension such that its side edges do not come into contact with said pin when a disconnection of the actuator from at least one of said parts takes place.

2. Safety attachment device according to claim 1, wherein the actuator comprises a casing from which said end parts emerge, and because said sides of the actuator are side walls of the casing from which said safety pins extend, such that said side arms surround at least part of said side walls.

3. Safety attachment device according to claim 1, wherein said safety pins are bolts screwed to said respective sides of said actuator.

4. Safety attachment device according to claim 1, wherein said safety pins are overhangs interlocked to said side parts of the actuator.

5. Safety attachment device according to claim 1 hereinabove, wherein said safety pins have free ends ending in widenings.

6. Safety attachment device according to claim 3, wherein each one of the safety pins is a bolt with one threaded end part and another end equipped with a head, and a smooth cylindrical part between said ends, the bolt being installed such that the threaded end is bolted to a respective side of the actuator, whilst the smooth cylindrical part of the bolt emerges from said respective side and through the window and the head of the bolt emerges through said window.

7. Safety attachment device according to claim 1, wherein said top part of the safety attachment device comprises a main fitting and a secondary fitting interconnectable to one another and which form a clamp which holds the reaction bar in place.

8. Safety attachment device according to claim 1, wherein a bottom part of at least one side arm comprises converging sections, being defined between respective free ends ends of said converging sections, an open section connected to the window and which is larger in size than the cross-section of the corresponding pin, and because the safety attachment device comprises a closing element which, in closing position, closes said open section, and blocking means for keeping the closing element in the closing position.

9. Safety attachment device according to claim 8, wherein the open section is located in an area corresponding to an upright projection of said pin.

10. Safety attachment device according to claim 8, wherein the closing element is a strip articulated by a first end part on an articulation point on one of the converging sections and connected by the blocking means by a second end part on the other of the converging sections.

11. Safety attachment device according to claim 8, wherein the closing element is a section of a length longer than an extension of said open section, and which can slide over said converging sections between a closing position in which it closes the open section and an opening position in which it does not cover at least part of said open section, and, in the closing position, said section is connected to at least one of said converging sections of a bottom edge of the window.

12. Safety attachment device according to claim 1, wherein on each side arm,
the window is bounded laterally between a first lateral section and a second lateral section of the side arm;
the first lateral section and the second lateral section are connected by means of a closing element which bounds a bottom edge of the window; and
a closing element is articulated by a first end at an articulation point on the second lateral section and connected by a second end to the first lateral section by means of blocking means.

13. Safety attachment device according to claim 12, wherein the closing element is a bar or a section.

14. Safety attachment device according to claim 11, wherein the section is of an inverted "U"-shaped cross-section.

15. Safety attachment device according to claim 2, wherein said safety pins are bolts screwed to the respective sides of said actuator.

16. Safety attachment device according to claim 2, wherein said safety pins are overhangs interlocked to said side parts of the actuator.

17. Safety attachment device according to any of claim 2 hereinabove, wherein said safety pins have free ends ending in widenings.

18. Safety attachment device according to any of claim 3 hereinabove, wherein said safety pins have free ends ending in widenings.

19. Safety attachment device according to any of claim 4 hereinabove, wherein said safety pins have free ends ending in widenings.

20. Safety attachment device according to claim 9, wherein the closing element is a strip articulated by a first end part on an articulation point on one of the converging sections and connected by the blocking means by a second end part on the other of the converging sections.

21. Safety attachment device according to claim 9, wherein the closing element is a section of a length longer than the extension of said open section, and which can slide over said converging sections between a closing position in which it closes the open section and an opening position in which it does not cover at least part of said open section, and, in the closing position, said section is connected to at least one of said converging sections of a bottom edge of the window.

* * * * *